March 16, 1965 R. R. KELLER 3,173,819
METHOD AND APPARATUS FOR PRODUCING DECORATIVE MOLDING STRIPS
Filed April 13, 1962 7 Sheets-Sheet 3
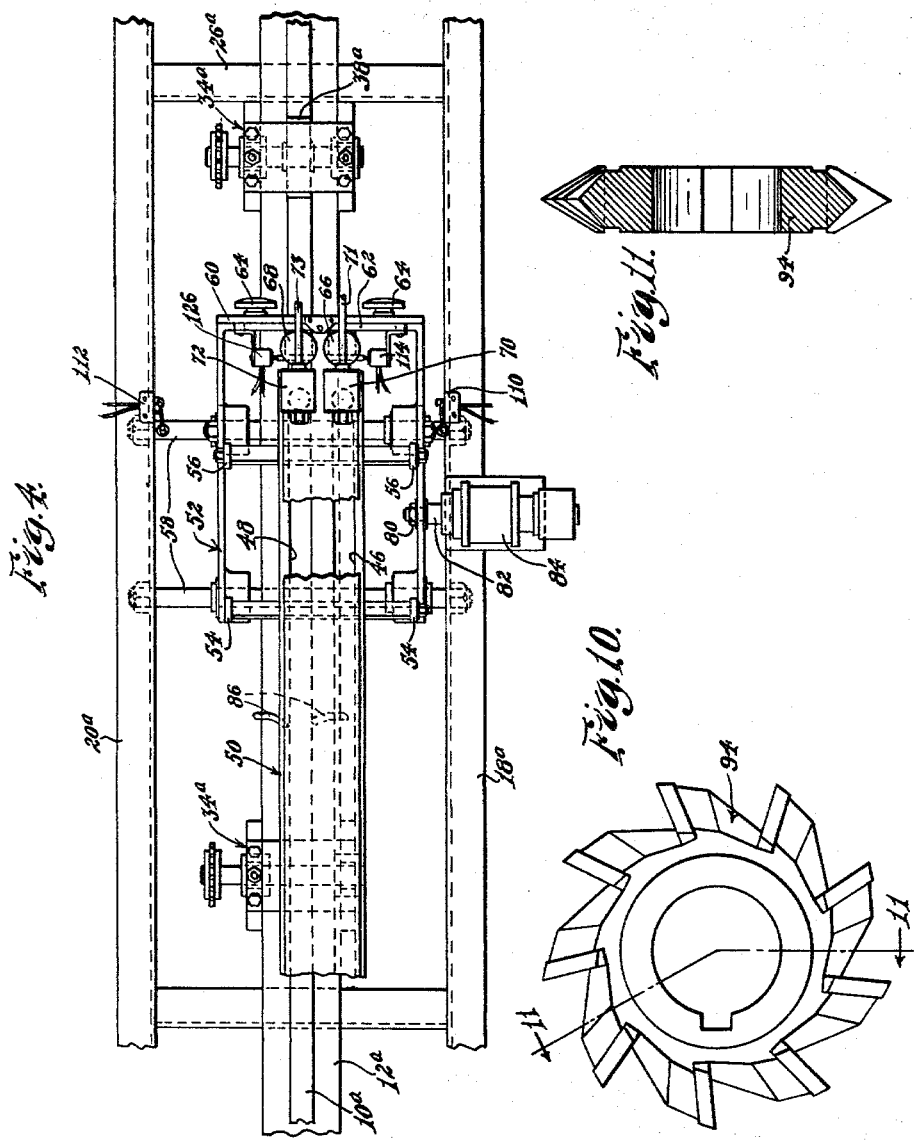
INVENTOR.
Robert R. Keller
BY his Atty.,
John H. McKenna

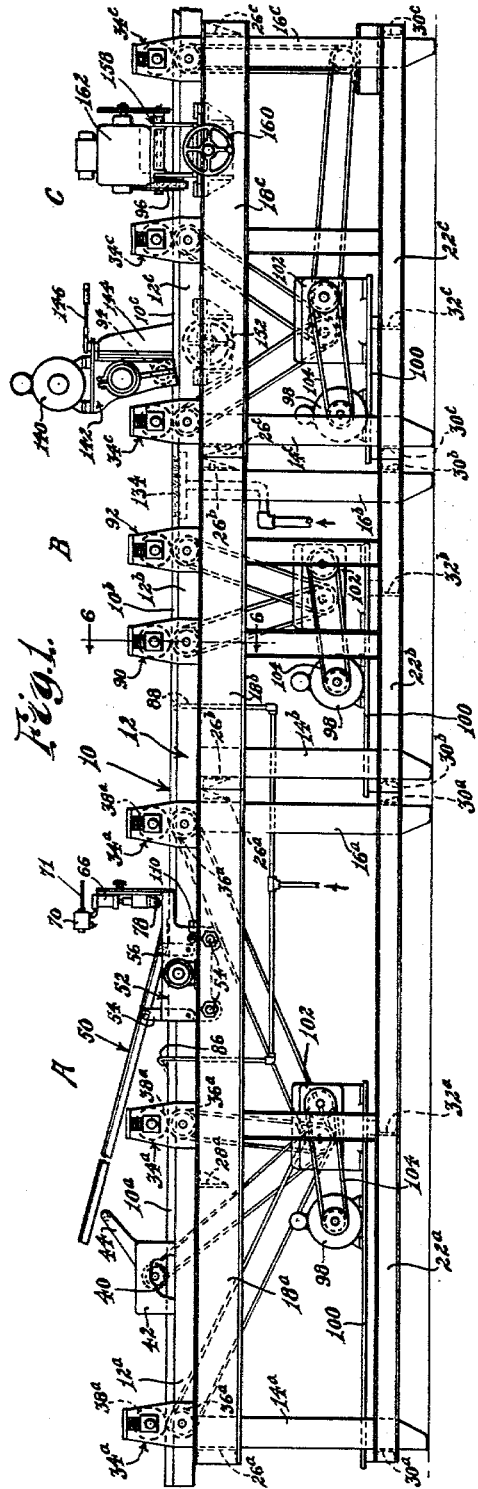

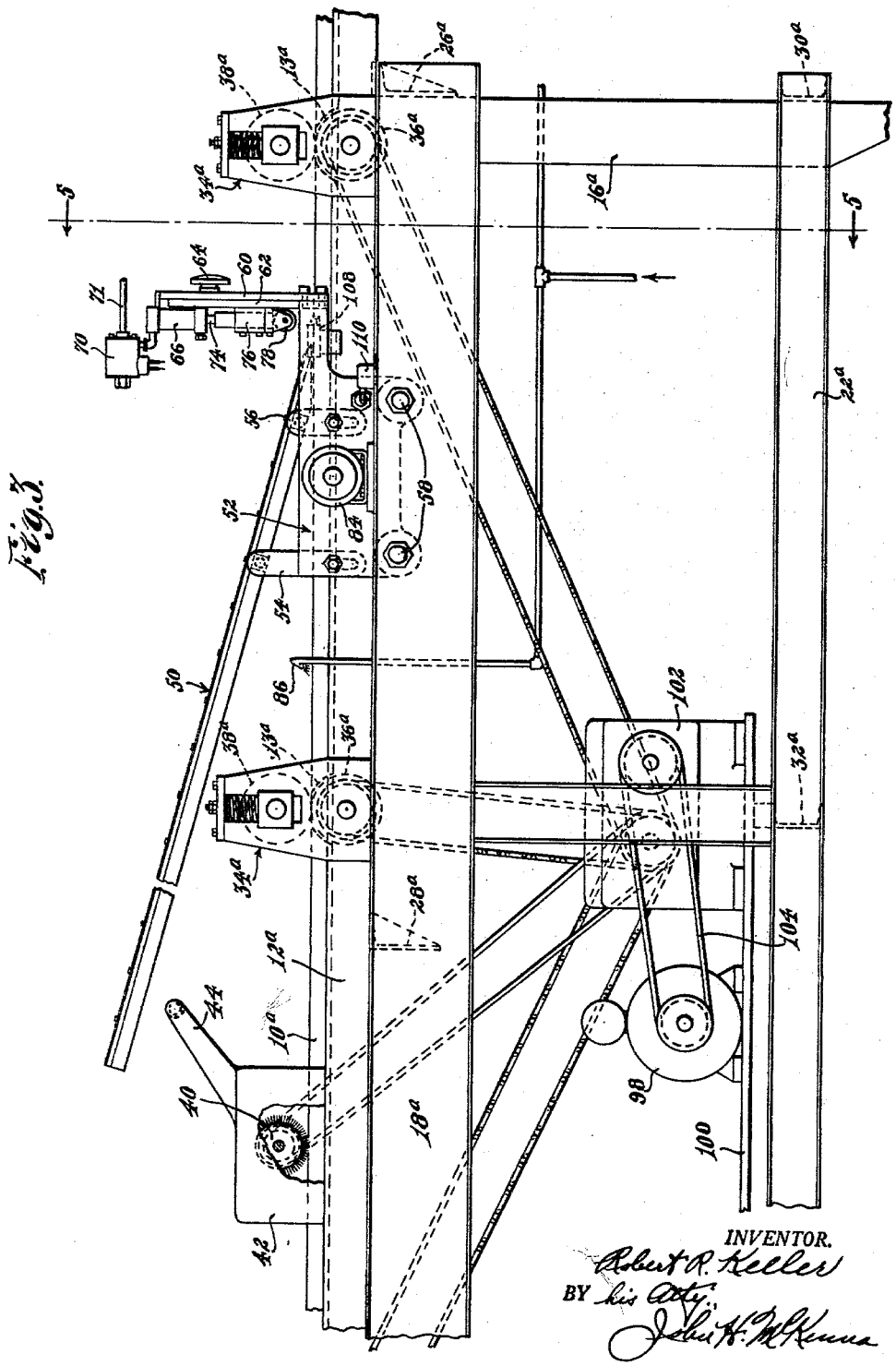

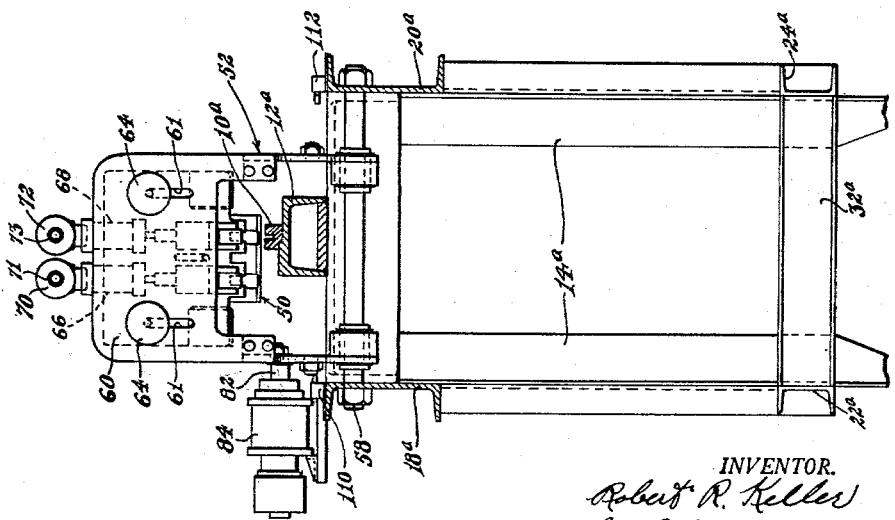

March 16, 1965   R. R. KELLER   3,173,819
METHOD AND APPARATUS FOR PRODUCING DECORATIVE MOLDING STRIPS
Filed April 13, 1962   7 Sheets-Sheet 5
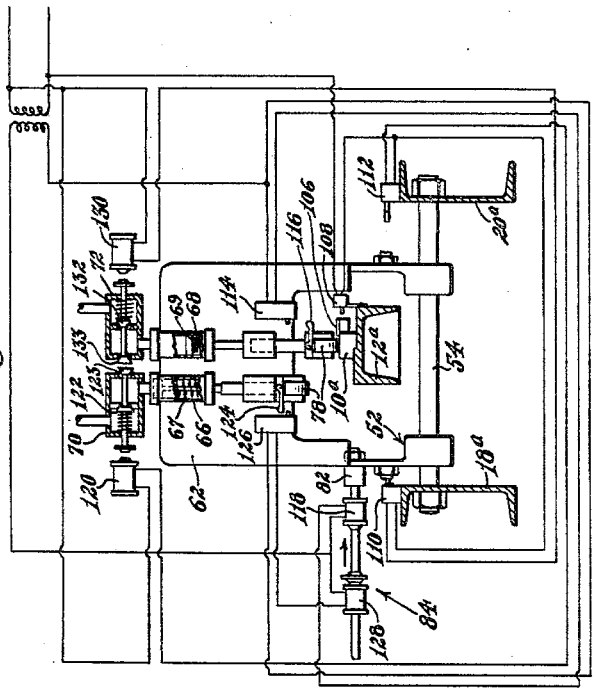
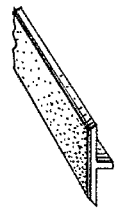
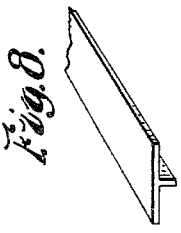
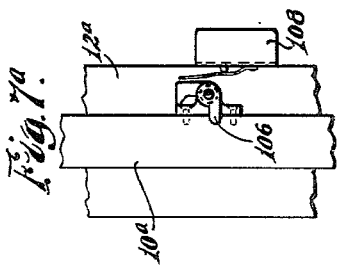
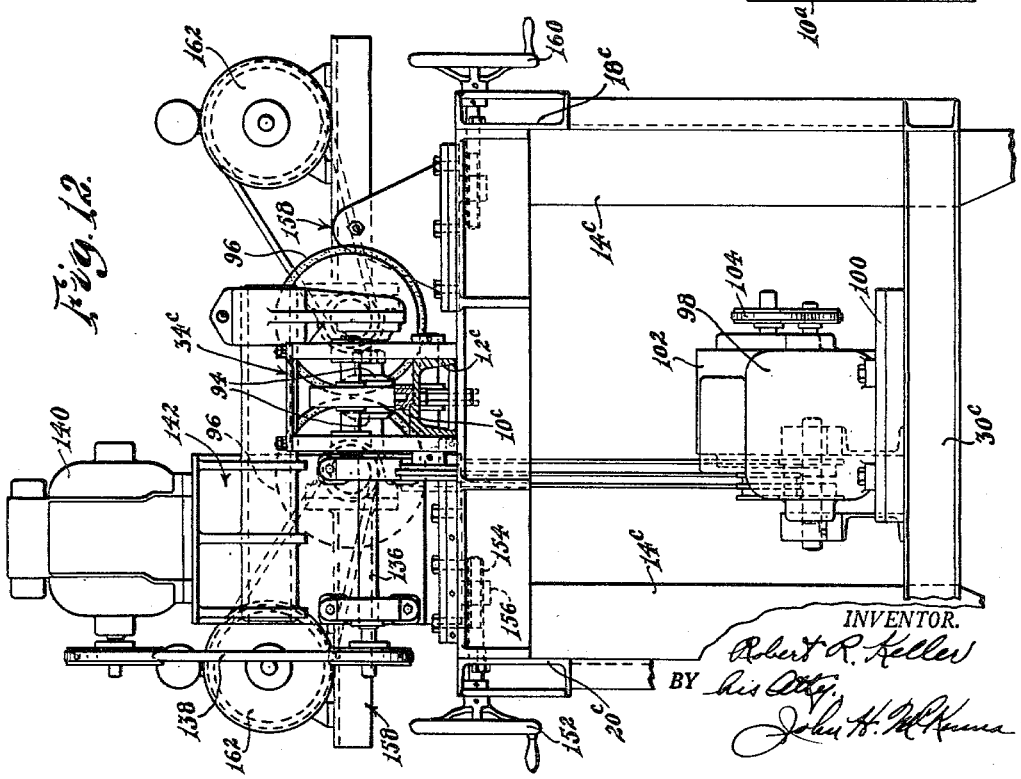
INVENTOR.
Robert R. Keller
BY his Atty.

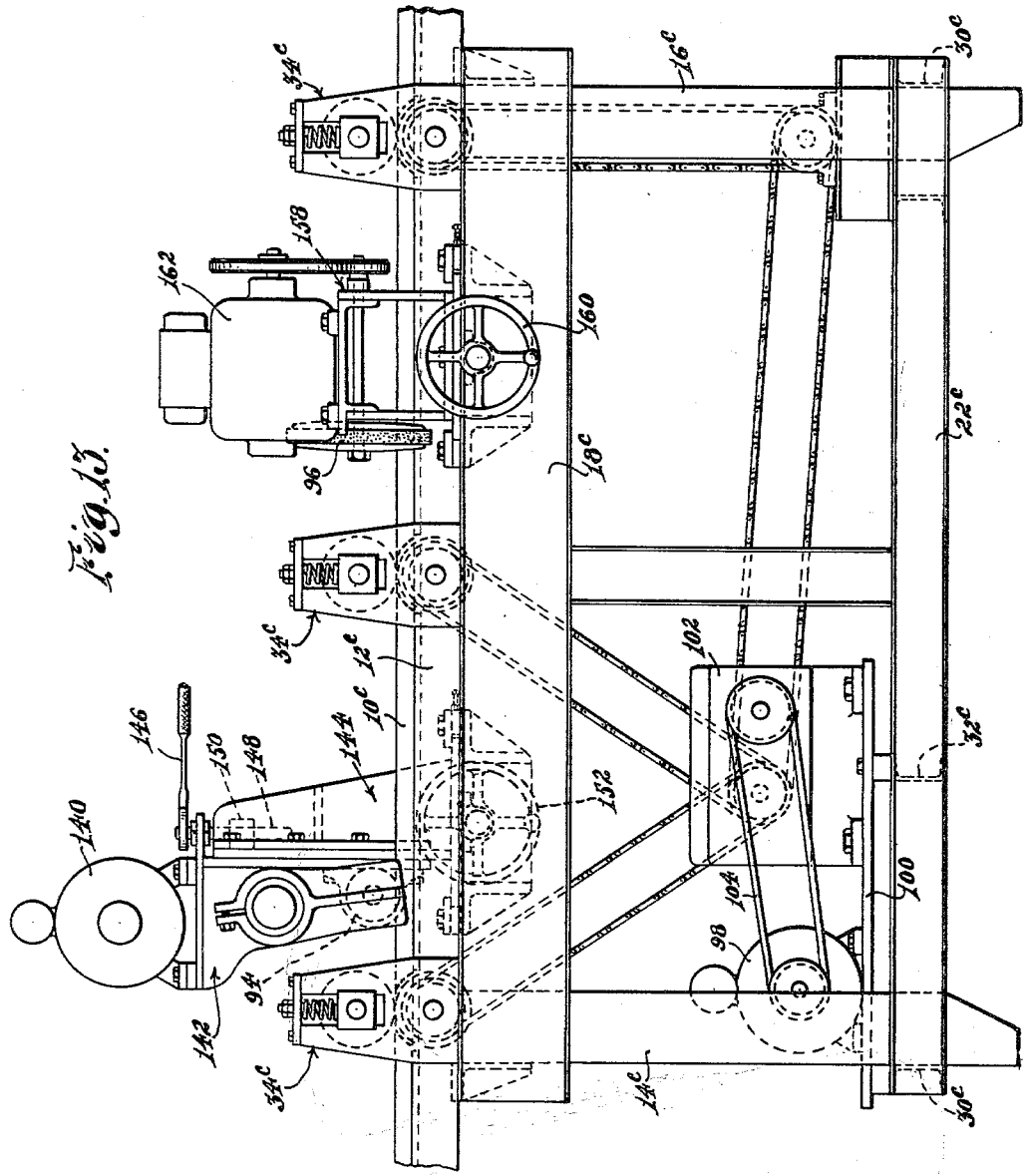

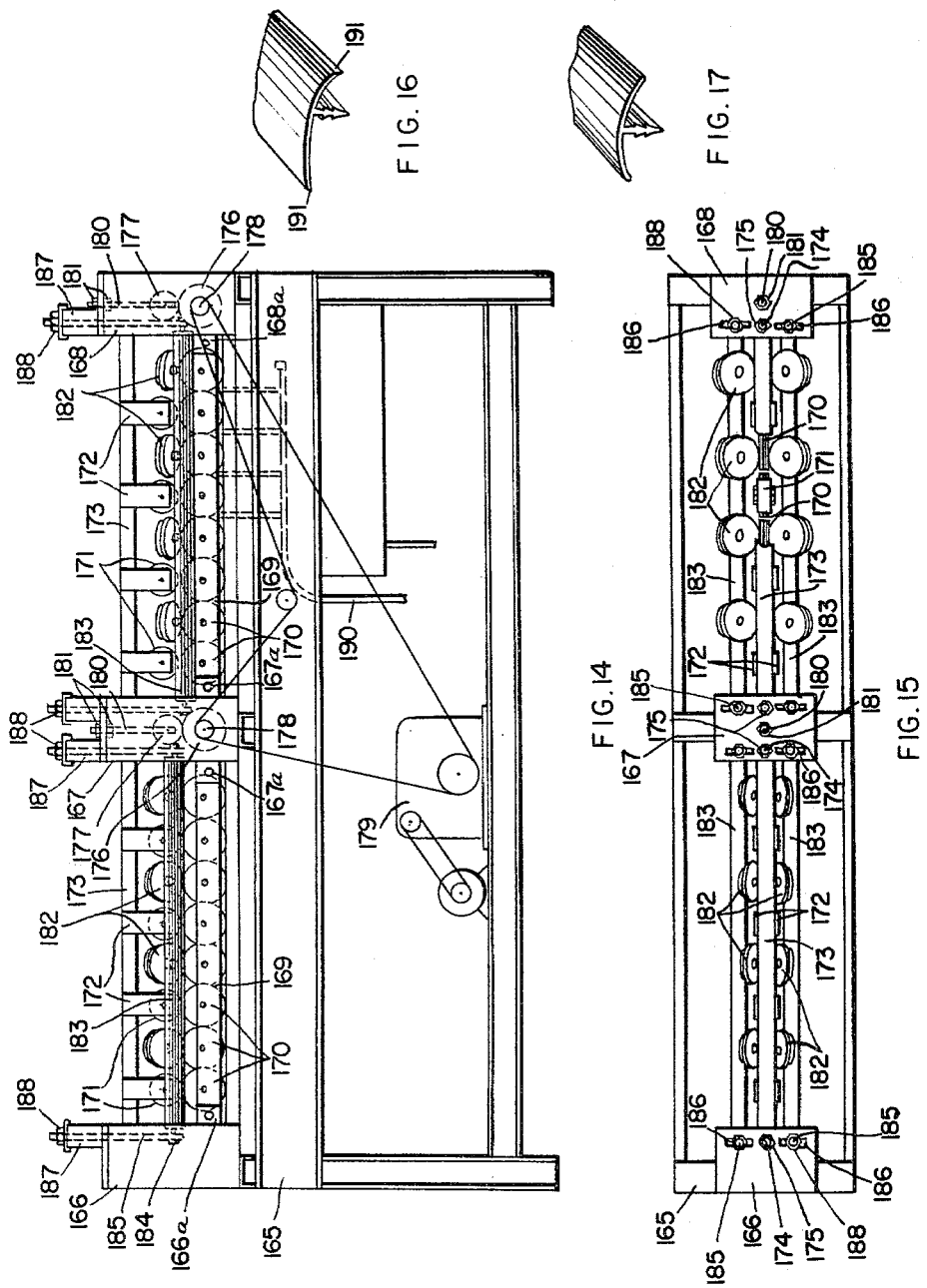

United States Patent Office 3,173,819
Patented Mar. 16, 1965

3,173,819
METHOD AND APPARATUS FOR PRODUCING DECORATIVE MOLDING STRIPS
Robert R. Keller, 41 Union St., Manchester, N.H.
Filed Apr. 13, 1962, Ser. No. 189,221
15 Claims. (Cl. 156—267)

This invention relates to improvements in methods and apparatus for producing decorative molding strips. More particularly the invention improves upon prior methods and apparatus for producing metallic molding strips having facing material bonded thereto. The facing material may be, for example, a decorative plastic in relatively thin strip form, a relatively thin strip of wood veneer, or relatively thin strips of other available and suitable facing materials.

This is a continuation-in-part of application Serial No. 637,413, filed January 31, 1957, now forfeited.

Metal molding strips have been used extensively as structural and decorative elements for building interiors, especially in connection with bars, counters, sinks, cabinets, tables, and the like. Wood and plastic molding strips also have been used to a considerable extent, but metal continues to be a preferred molding strip material.

However, modern trends to color and artistic effects in interior decorating motifs have introduced problems in the metal molding strip art, in that it has been impractically difficult to produce metal molding strips capable of satisfactorily and durably providing the wanted color and surface effects. Metal molding strips having painted and enameled surfaces, and even glazed surfaces, have proven unsatisfactory for various reasons.

It is among the objects of the present invention to provide a molding strip facing method whereby a surface or surface portion or portions of a metal molding strip may be treated to provide it with a relatively permanently durable and attractive surface aspect which may be of any selected color or color combination or of other surface aspect for carrying out any particular decorating motif.

Another object of the invention is to provide a molding strip facing method whereby a strip of relatively thin facing material may be more durable and effectively bonded to a metal molding strip, as compared with the prior ineffectual procedures for covering and decorating metal molding strips.

A further object of the invention is to provide a molding strip facing method wherein separate predetermined lengths of facing strip material in a plurality of laterally spaced runways may be applied alternately to metal molding strips traveling in spaced succession along a guide track, or the like.

Yet another object of the invention is to provide a molding strip facing apparatus wherein metal molding strips advance in spaced succession along a guide track and facing strips in a plurality of runways of a carriage are applied and bonded to the successive metal molding strips, the facing strips being taken alternately from the said plurality of runways.

Still another object of the invention is to provide a molding strip facing apparatus wherein metal molding strips in spaced succession are subjected to heat as each approaches a facing-applying station at which a facing strip is applied and adhered to the molding strip, each molding strip with a facing thereon passing thence progressively through heating, pressure-bonding, cooling, and edge-finishing stations prior to delivering from the apparatus.

Another object of the invention is to provide a molding strip facing apparatus wherein metal molding strips, in spaced succession, are subjected to heat as each approaches a facing-applying station at which a strip of relatively thin facing material is applied and adhered thereto, each said molding strip with a said facing strip thereon passing thence progressively through heating, pressure-bonding, cooling and edge-forming and edge-finishing stations prior to delivering from the apparatus.

Yet another object of the invention is to provide a molding strip facing method wherein a strip of thin facing material may be bonded effectively to a relatively long molding having a rounded, lateral cross-section.

Still another object of the invention is to provide a molding strip facing apparatus wherein facing material is applied to a relatively long, laterally, cross-sectionally rounded or curved molding strip and wherein the mutually advancing facing and molding strips are pressed together over their entire length by a plurality of pressure means arranged to squeeze together the strips successively over different portions of their lateral cross-section.

It is, moreover, the purpose and primary opject of the invention generally to improve molding strip facing procedures and devices and especially such procedures and devices for producing metal molding strips having surfaces or surface portions faced with applied and bonded strips of relatively thin facing material.

In the accompanying drawings:

FIG. 1 is a side elevation of molding strip facing apparatus suitable for practicing the method of the invention, and embodying features of the invention;

FIG. 2 is a top plan view of the major portion of the apparatus of FIG. 1;

FIGS. 3 and 4 are respectively side elevation and top plan views of portions of the apparatus, including the facing strip applying mechanism, on a scale larger than that of FIGS. 1 and 2;

FIG. 5 is a cross-sectional view on line 5—5 of FIG. 3, on the scale of FIG. 3;

FIG. 6 is a cross-sectional view on line 6—6 of FIG. 1, on a larger scale;

FIG. 7 is a diagrammatic view illustrating the electrical control of the facing-applying portions of the apparatus;

FIG. 7a is a fragmentary detail top plan view of the track switch and its molding strip actuated control means;

FIG. 8 is a fragmentary perspective view of a metal molding strip which may be faced in accordance with the invention;

FIG. 9 is a view similar to FIG. 8 of a faced and finished molding strip of the FIG. 8 variety;

FIG. 10 is a side elevation of one of the edge-beveling cutters;

FIG. 11 is a cross-sectional view on line 11—11 of FIG. 10;

FIG. 12 is an end elevation of section C of the apparatus looking at that end which is the left hand end of FIG. 1;

FIG. 13 is a side elevation of section C on the scale of FIG. 12;

FIG. 14 is a side elevation of a modified form of the intermediate frame section denoted by the letter B of the apparatus in FIGS. 1 and 2 showing modified pressure bonding units, and being on a larger scale;

FIG. 15 is a top plan view with parts broken away of FIG. 14;

FIG. 16 is a fragmentary perspective view of a modified form of faced and finished molding strip made with the FIGS. 14 and 15 modified form of this invention; and FIG. 17 is a fragmentary perspective view of a further modified form of faced and finished molding strip which may be made with the FIGS. 14 and 15 form of this invention.

Referring to the drawings, and more particularly to FIGS. 1 and 2 thereof, a relatively long track 10 is suitably secured, removably, on a similarly long supporting member 12 which conveniently may be a channel iron member, sections 12$^a$ and 12$^b$ of which are shown in cross-section in FIGS. 5 and 6. Member 12 may be mounted on a suitable frame which also supports the various devices and mechanisms which are to act upon a metal molding strip, and apply facing material thereto, as the molding strip moves along the track 10.

Conveniently, the apparatus may be made in a plurality of sections arranged end to end, with the track 10 and its support 12 also in sections. Three sections are illustrated in FIGS. 1 and 2, indicated generally at A, B and C. Section A comprises a frame which is made up of four legs 14$a$, 14$a$, 16$a$, 16$a$, rigidly connected together at opposite sides of the frame by upper horizontal channel members 18$a$, 20$a$ and lower horizontal channel members 22$a$, 24$a$. The upper channel members 18$a$, 20$a$ may be connected together by suitably disposed cross-supports 26$a$, 28$a$, and the lower channel members may be connected together by suitable cross-supports 30$a$, 32$a$. A section 12$a$ of the track support 12 is suitably secured to the upper cross-supports 26$a$, 28$a$, and a section 10$a$ of track 10 is suitably secured, removably, to the support section 12$a$.

Metal molding strips are to be moved in spaced succession along track 10, and the cross-sectional shape of the track will be selected to accommodate any particular shape of the molding strips which are to be processed. For the purposes of the present disclosure, FIGS. 1 and 2, it is assumed that the molding strips have shape as shown in FIG. 8 and that the delivering finished product is to be as represented in FIG. 9.

Section A includes three similar spaced feed units 34$a$, each including a driven roll or wheel 36$a$ and a spring-biased roll or wheel 38$a$, biased toward contact with driven roll 36$a$. Driven roll 36$a$ rotates within the channel of supporting section 12$a$ which latter and track section 10$a$ are cut away at 13$a$ (FIG. 3) to permit roll 36$a$ to engage the under side of a molding strip on track section 10$a$, with roll 38$a$ resiliently engaging the upper side of the strip as the strip engages between the rolls and is fed along the track by coaction of the rolls.

Between the first and second feed units 34$a$, the upper face of a metal molding strip on track 10 preferably is subjected to the roughing action of a rotating wire brush 40, or the like, which may operate within a housing 42 having a suction conduit 44 leading therefrom to any suitable source of suction.

Facing strips of plastic material, wood veneer, or other suitable facing material, are to be applied in succession to the metal molding strips as they advance in succession along track 10. The facing strips are applied, in the illustrated apparatus, at a location between the second and third feed units 34$a$, they being held in two side-by-side track grooves 46, 48 (FIG. 4) of an inclined member 50 which is mounted on a transversely movable carriage indicated generally at 52. Inclined member 50 is adjustably mounted on the carriage by means of slotted arms 54, 56, whereby the inclination of member 50 may be selected to suit any particular conditions or requirements. Also, the delivery end of member 50 may be adjusted vertically as may be desirable when one track is removed in favor of another.

Carriage 52 is slidably mounted on two spaced and parallel transverse rods or shafts 58 which have fixed extent between the upper side channel members 18$a$, 20$a$. The end of the carriage 52 which is forward, in the direction of feed through the apparatus, has rigidly fixed thereon the upright transversely disposed plate member 60 on which a carrier plate 62 is vertically adjustable by means of threaded lugs on plate 62 which extend loosely through slots 61 in plate member 60, with the clamping knobs 64 screwed on the lugs and adapted to be manually tightened to clamp plate 62 in any selected position.

As best seen in FIGS. 3–5, two similar cylinders 66, 68 are mounted in fixed spaced relation on the plate 62, and the upper end of each said cylinder has conduit connection to the interior chamber within one of the separate control housings 70, 72 which are supported above the cylinders in fixed relation thereto. Pressure fluid, from any suitable source, may be conducted to the separate housings through conduits 71, 73, and each housing has a known type of electrically responsive valve means therein for controlling the admission of pressure fluid from the housing chambers to the cylinders 66, 68. Each cylinder has an actuating rod or piston rod 74 projecting slidably through the lower end of its cylinder and through suitable guide means 76 rigid on plate 62. The lower end of each rod 74 carries a roller 78 which is adapted to engage facing material and press it into adhering contact with an advancing molding strip when a said roller 78 is moved downward in response to fluid pressure acting within a cylinder 66 or 68.

Carriage 52 is connected at 80 to one end of a rod or plunger 82 which extends slidably through one end of a cylinder 84 which may be fixed on upper side channel member 18$a$ centrally beside the carriage. Cylinder 84 has a known type of electrically responsive piston means therein for actuating the carriage 52 from one to the other of its two operative positions along the transverse rods 58.

Before the metal molding strip on track section 10$a$ reaches the location of transverse carriage 52, it preferably is heated by suitable means, such as acetylene torch devices 86 which may direct flame from opposite sides on the molding strip as it passes between the second feed unit 34$a$ and carriage 52. Hence, the molding strip coming under a pressure roller 78 is in condition to soften adhesive which is to serve as the bonding agent between the metal molding strip and an applied facing strip. The adhesive conveniently may be carried on the under sides of the facing strips, although the adhesive may be applied in a fluid state either to the facing strips or to the metal molding strips during the combining process, if desired.

Facing strips are applied alternately from the track grooves 46, 48 as carriage 52 reciprocates between its operative positions.

The metal molding strip, with a facing strip thereon, passes thence through the third feed unit 34$a$ and is again heated by acetylene torch devices 88, or other heating means, before passing to and through the similar pressure bonding units 90, 92 on the intermediate frame section B. Frame section B has upper side channel members 18$b$, 20$b$, lower side channel members 22$b$, 24$b$, cross-members 26$b$, 30$b$, 32$b$, and legs 14$b$, 16$b$. The track section 10$b$ is removably mounted on its supporting member 12$b$.

The third frame section C has three feed units 34$c$ spaced therealong and has beveling cutters 94 at a location between the first and second feed units 34$c$ and in positions to precisely bevel the opposite side edges of the faced metal molding strip. The faced and beveled molding strip passes thence through the second feed unit 34$c$ and between the two abrasive wheels 96 which nicely finish the composite beveled surfaces of the molding strip prior to passage thereof through the third feed unit 34$c$ and on out of the apparatus. However, the finishing operations performed at frame section C may vary depending upon the type and configuration of any particular molding strip that is being processed. Frame section C has upper side channel members 18$c$, 20$c$, lower side channel members 22$c$, 24$c$, cross-members 26$c$, 30$c$, 32$c$, and legs 14$c$, 16$c$, and has track section 10$c$ removably mounted on supporting section 12$c$.

In the illustrated embodiment of the invention, each frame section A, B, C has its own electric motor 98 supported on a suitable platform 100, and each motor has associated with it a reduction gear transmission 102 which may be belt driven from the motor as at 104. The feed units 34ᵃ, 34ᶜ, and the combined feeding and pressure-bonding units 90, 92, preferably will be chain driven from the appropriate transmission 102. Also, the brush 40 on section A may be either chain driven or belt driven from either shaft of the transmission 102 on section A, or directly from the motor shaft.

The metal molding strips may enter the apparatus by inserting a leading end of each strip between the feed rollers 36ᵃ, 38ᵃ of the first feed unit 34ᵃ on frame section A, the molding strip being fed at a suitable rate past the roughing brush 40 and to and through the second feed unit 34ᵃ on frame section A. The molding strips may, for example, be eight feet long, fed in succession into the apparatus and advancing along track 10 at a continuous, predetermined rate of travel. This rate of travel is limited to some extent by the required finishing operation at frame section C, in that the operation of beveling the opposite sides of molding strips, of the type as illustrated in FIGS. 8 and 9, must be accomplished without chattering or other deleterious effects. It has been found that when the molding strips feed through the apparatus at a rate of from 8-40 feet per minute, excellent results may be attained, and this rate of travel may be substantially increased without any serious deleterious effects.

Each advancing metal strip may be pre-heated to approximately 200° F. by the acetylene torch means 86 before it reaches the transverse carriage 52 which latter will be in either of its two operative positions. Assuming that it is in its position of FIGS. 4 and 7, with cylinder 68 centered above track section 10ᵃ, the leading end of an advancing metal molding strip engages and actuates a lever 106 of which one arm projects into its path on track section 10ᵃ as best seen in FIG. 7a. Actuation of lever 106 by the advancing molding strip closes a normally open switch 108 on track support 12ᵃ thereby to condition an electrical circuit for effecting a downward actuation of one of the pressure rollers 78 when carriage 52 moves to close the proper one of two normally open switches 110, 112 mounted beside the carriage respectively on the upper side channel members 18ᵃ and 20ᵃ. So long as a metal molding strip is passing switch 108, this switch will be held closed.

Referring to the diagrammatic showing of FIG. 7, it may be assumed that the piston means within cylinder 68 has actuated its roller 78 to apply a facing strip from track groove 48 of member 50 to a metal molding strip and that the faced molding strip has passed beyond switch 108 and that the depressed roller 78 is ready to move upward. Hence, switch 108 is open and, as the depressed roller 78 moves upward, an adjacent normally open switch 114 on plates 62 is momentarily closed by arm 116 which moves with roller 78 upward past switch 114. This momentary closing of switch 114, which is in a secondary low voltage circuit of the order of 8 v., energizes a coil 118 of the carriage actuating means 84 which may be a known type of double-acting means which responds to a momentary energization to shift carriage 52 from its position of FIGS. 4 and 7 to its other operative position in which it closes switch 112. This shift of carriage 52 centers cylinder 66 above track section 10a and conditions a 220 v. circuit for energization of a coil 120 on plate 62 as soon as a metal molding strip comes into position on track 10 to close switch 108. Energization of coil 120 effects opening of a valve means 122 for pressure actuation of the piston means within cylinder 66. Hence the depressed roller 78 applies a facing strip from track groove 46 of member 50 to the advancing metal molding strip, following which this depressed roller 78 moves upward to cause an arm 124 to momentarily close an adjacent switch 126 on plate 62. This momentarily energizes a coil 128 of the carriage-actuating means 84 to effect a movement of the carriage back to its FIGS. 4 and 7 position in which it closes switch 110, thereby conditioning the 220 v. circuit, as in FIGS. 4 and 7, for energization of a coil 130 on plate 62 as soon as a metal molding strip closes switch 108. Energization of coil 130 effects opening of a valve means 132 for pressure actuation of the piston means within cylinder 68.

The valve means 122, 132 may be any suitable electrically responsive means, and the piston means within the cylinders 66, 68 may be of any suitable variety having provision for restoring the rollers to their upper positions when the valve means 122 or 132 closes. In this connection, venting valves 123, 133 are represented in FIG. 7, adapted to open when the associated fluid-control valves 122, 132 close, and spring means 67, 69 within cylinders 66, 68 constitute means for restoring the rollers 78 following closing of valves 122, 132.

The metal molding strips, with facing strips applied and adhered thereto, travel from the facing-applying station to and through the third feed unit 34a of section A and are subjected to the heating effects of the acetylene heating means 88 before entering the combined feeding and pressure bonding units 90, 92 on section B. Heating means 88 supply heat suitable for elevating the temperature at the glue-line of the strips to around 300° F., or whatever other temperature may be desirable. In some cases it may be desirable to do all the heating at the location of the heating means 86, in which case the metal strips may be heated at 86, to as much as 340° F. Natural gas burners may be substituted for the torches 86 if found necessary or desirable for getting the needed relatively high temperatures. The pressure bonding units 90, 92 may be adjusted to apply around seventy-five pounds of pressure per square inch to the faced strips, although the applied pressure may vary considerably between thirty and three hundred fifty pounds per square inch under particular conditions.

Leaving the pressure bonding unit 92, the faced strips are cooled by water sprays at 134 before passing to and through the first feed unit 34ᶜ of section C. Advancing from unit 34ᶜ, each faced molding strip passes between the two edge-beveling cutters 94 which are specially designed cutters as illustrated in FIGS. 10 and 11. In the illustrated apparatus, the cutters 94 are mounted on a shaft 136 which is belt-driven at 138 by motor 140 (FIG. 12). The shaft 136 and motor 140 may be mounted on a sub-carriage 142 which is vertically adjustable on a main carriage 144 by means of hand lever 146 by which a vertical screw 148 on the sub-carriage is rotatable within a fixed nut 150 on the main carriage (FIG. 13). The main carriage 144 may be adjusted transversely by a hand wheel 152 on one end of a screw 154 rotatably fixed on the main carriage and threaded through a fixed nut 156 on the frame of the apparatus.

The beveled molding strips pass through the second feed unit 34ᶜ and thence between the two abrasive wheels 96, or other finishing elements, such as brushes, which finish the beveled surfaces prior to delivery of the molding strips from the endmost feed unit 34ᶜ.

The abrasive wheels 96 are mounted on separate transversely adjustable carriages 158, each manually adjustable by means of a hand wheel 160. A separate motor 162 on each carriage 158 has belt-driven connection to the shaft of the wheel 96 which is on a said carriage.

The facing strip material may vary considerably depending upon particular requirements and desires. The facings are thin, such as from 8–14 thousands of an inch in thickness. Wood veneer facing strips may be employed for particular effects, and commercially available "glassine" materials have given excellent results. This latter material is a light weight very dense and highly calendered material. It consists primarily of sulphite pulp to which a minor amount of kraft pulp is added. Available "glassine" may be opaque, translucent or transparent and may have color or color design effects to suit any particular whim or desire. However, any of various other materials may serve as facing materials with satisfactory results.

The adhesive used may vary considerably under different processing conditions. Contact type rubber base adhesives are recommended. Contact type synthetic rubber base adhesives also have been found to be highly satisfactory, such as "Hycar" and neoprene adhesives, and the like. The adhesive preferably is in dry condition on the under side of the facing strips, being rendered tacky by the pre-heated metal strips.

The specially designed beveling cutters 94 desirably will be driven at around 4300 r.p.m. and, as before stated herein, the molding strips may advance along track 10 at a rate up to forty feet per minute or thereabout for the best results. It should be understood, however, that the strips may feed at speeds substantially below and also above the stated speed with varying degrees of acceptable results.

The degree of bevel of the side edges of the strips desirably will be around 53° although bevels within the range of 25°–80° have proven acceptable.

FIGS. 14 and 15 show a modified form of intermediate frame section B adapted to receive from section A and apply bonding pressure to relatively long moldings having surfaces to be faced which are laterally rounded or curved, and thus to produce the finished, facing molding strips illustrated in FIGS. 16 and 17.

The modified intermediate frame section comprises a suitable table or base 165 for being secured between frame sections A and C. Mounted at spaced locations on the top of table 165 are three upstanding, open ended, rectangular supports 166, 167, 168 having lower side protruding ears 166$^a$, 167$^a$, 168$^a$ respectively. Secured between ears 166$^a$, 167$^a$ and between ears 167$^a$ and 168$^a$ are a pair of horizontal bars 169 aligned end to end and each having a series or train of vertically disposed rolls or wheels 170 journaled for rotation thereon. Rolls 170 are aligned with track sections 10$^a$ and 10$^c$ in frame sections A and C respectively, and are all centrally grooved to accommodate the bottom mounting fin of an advancing molding strip. Opposing alternate ones of rolls 170 are a series of upper, relatively wide pressure rolls 171 journaled in a corresponding series of depending brackets 172 supported by a pair of horizontal bars or frame elements 173 vertically adjustably secured at their ends to upstanding supports 166, 167 and 167, 168 respectively by means of vertical threaded shafts 174 connected at their lower ends to the ends of bars 173 and extending upwardly through the tops of upstanding supports 166, 167, 168 and removably fastened there by lock nuts 175.

Mounted within each support 167, 168 are pairs of lower and upper, opposing, drive and driven wheels 176, 177 arranged and adapted to engage at their respective nips an advancing molding strip and to further advance it along the track. Drive wheels 176 are journaled in opposite side walls of supports 167, 168 and their shafts have fixed thereon exteriorly located pulleys 178 adapted to the belt or chain driven in the usual way by a motor driven reduction gear transmission 179 mounted on a lower part of table 165. Driven wheels 177 are, in turn, supported for rotation within the supports by depending brackets 180 having threaded upper ends extending through the tops of supports 167, 168 and being vertically adjustably secured there by locks nuts 181.

In accordance with the invention, means are provided for applying bonding pressure to the faced surface of an advancing molding strip successively over different portions of its lateral extent or width and at different angles thereagainst. The aforementioned means comprise more particularly a plurality of vertically, laterally and angularly adjustable, beveled pressure rolls 182 opposing alternate ones of rolls 170 at each side thereof and alternating also with upper rolls 171. The rolls 182 are conveniently mounted in sets for rotation on horizontal tubular frame members 183 adjustably connected at their butt ends by bolts 184 to the lower ends of vertical shafts 185 whose upper ends are threaded and extend through lateral slots 186 in the tops of supports 166, 167, 168 and thence through collars 187 and are adjustably fastened to the supports by lock nuts 188. It is clear from the above that a particular set of pressure rolls 182 is adjustable vertically and laterally by loosening the appropriate lock nuts 188 and suitably positioning its shafts 185 up or down and/or laterally in slots 186. And it will be understood also that merely by loosening the appropriate bolts 184, each set of rolls 182 may be adjusted angularly with respect to the path of travel of an advancing strip and so that the rolls engage the strip from the side at selectively different angles. Thus, in FIGS. 14 and 15, the two right-hand roll sets are adjusted below the left-hand roll sets and are inclined at a greater angle with respect to the vertical direction so that they will together apply bonding pressure over the entire faced surface of an advancing, symmetrically rounded molding strip such as the one illustrated in FIG. 17.

When pressure rolls 171, 182 are adjusted properly, the correct bonding pressure is applied to each longitudinal increment of the faced surface successively over successive portions of its width so that each increment is pressed first at the point of initial contact of the facing and molding, and then at points adjacent thereto. Also, to prevent wrinkles from forming in the facing, rolls 182 are desirably beveled and positioned so as to overlap, or in other words, to apply pressure over at least a part of the strip surface portion subjected to pressure from a preceding roll thereby assuring constant and successive pressure engagement over the entire lateral cross-section of each strip increment.

Thus, a molding of the shape illustrated in FIG. 17, for example, may have its facing strip applied in frame section A of the apparatus, and on passing out of that section the uppermost portions near the centerline of each longitudinal increment of the mutually advancing strips are vertically pressed together by feed unit 34$^a$ and also by the first vertical pressure roll 171. At a subsequent location along the track, bonding pressure is applied to the same increment by the left-hand sets of rolls 182, FIG. 14 over strip portions outwardly on both sides from the aforementioned first engaged uppermost strip portions. At a still further location along the track, the same longitudinal strip portion is subjected to pressure from the right-hand sets of rolls 182, FIG. 14 positioned to press against the remaining strip portions even further out on both sides from the centerline of and adjacent the edges of the faced strip.

As seen from the above, the number of sets of and the particular adjustment of an individual set of pressure rolls 182 will depend upon the particular shape and curvature of the molding to be faced. For example, to face the unsymmetric strip illustrated in FIG. 16, the rolls applying bonding pressure to the right side of the strip should be set below and at a greater angle with the vertical direction than the corresponding rolls applying pressure to the left side of that strip. And bonding pressure may be applied to molding strips having even greater surface curvature than those illustrated in FIGS. 16 and 17 merely by utilizing two or more modified intermediate frame sections in series and suitably positioning the successive rolls 182.

In any case, it will be understood that when a strip passes through the instant apparatus, all portions of the strip surface to be faced are subjected to pressure from one or more of pressure rolls 171, 182. Subsequently, the faced strip is rapidly cooled by water from a source indicated at 190 thereby setting the bonding adhesive, and advanced through frame section C of the apparatus. In frame section C, the faced strip may, if desired, be subjected to cutters 94 as described previously in which case there results the FIG. 16 illustrated rounded molding strip having beveled side edges 191. On the other hand, if it is desired to produce a finished, rounded strip having unbeveled edges such as illustrated in FIG. 17, the cutters 94 may be retracted out of the way of the advancing strip.

It is intended that the patent shall cover, by suitable expression in the appended claims, whatever features of patentable novelty exist in the invention disclosed.

I claim as my invention:

1. The method of producing relatively rigid but bendable molding strips, comprising providing a continuous supporting track for the strips, supplying a series of relatively rigid metallic molding strips to the track in succession, engaging the strips at one or more intervals along the track and to advance them in said succession and at a predetermined rate of travel, applying heat to each advancing strip before it reaches a predetermined first location along the track, the said heat being of a magnitude such that each strip arriving at said first location has an elevated temperature between 200° and 350° F., disposing a flexible decorative facing strip above and in spaced relation to the track with its leading end stationary at said first location, depressing the said leading end of said facing strip into adhering contact with the leading end of an advancing molding strip when the latter said leading end reaches said first location, whereby said facing strip advances with the molding strip, applying bonding pressure to the mutually advancing molding strip and facing strip, with adhesive between them, as said strips advance through a predetermined second location along the track thereby to apply and bond the facing strip to the molding strip throughout the length of the latter, followed by cooling the advancing faced molding strip, and then simultaneously beveling opposite side edge portions of the advancing faced molding strip to provide angularly related edge surfaces composite of metal and facing strip material, with said edge surfaces spaced a substantial distance apart to provide a substantial faced area of the strip between them, and with the planes of said beveled edges converging at the faced side of the molding strip.

2. The method of producing decorative molding strips, as defined in claim 1, wherein the surface of each said advancing metallic molding strip which is to be faced with a said decorative facing strip is subjected to a roughing process before the leading end of any particular metallic strip reaches the said predetermined first location.

3. The method of producing decorative molding strips, as defined in claim 1, wherein the said predetermined rate of travel of said metal molding strips is from twenty to forty feet per minute.

4. The method of producing decorative molding strips, as defined in claim 1, wherein the said facing strip has thickness of from 8-14 thousandths of an inch.

5. The method of producing decorative molding strips, as defined in claim 1, wherein the facing strip is a calendered strip of plastic material having thickness of from 8-14 thousandths of an inch.

6. The method of producing decorative molding strips, as defined in claim 1, wherein the facing strip is a wood veneer strip having thickness of from 8-14 thousandths of an inch.

7. The method of producing decorative molding strips, as defined in claim 1, wherein adhesive in a dry state is on the said facing strip and is rendered tacky immediately upon contact with the heated molding strip both at and beyond said predetermined first location.

8. Apparatus for producing relatively rigid but bendable decorative molding strips, comprising a relatively long and straight track having predetermined first and second locations therealong, means for continuously advancing a relatively rigid metallic molding strip along said track to and through each of said loctaions in succession, means for heating said strip as it passes through said first location, a vertically actuatable presser means above said track at said second location along the track, means for holding a flexible facing strip above and along said track with its leading end portion stationary between said presser means and said track, electrically responsive means for effecting a downward movement of said presser means, control mechanism at said second location along said track for energizing said electrically responsive means when the leading end of said metal strip reaches said second location and for maintaining the responsive means energized so long as said metal strip is passing through said second location, whereby the resulting downward movement of said presser means first applies only the leading end portion of said facing strip to the leading end portion of said metal strip and then presses the entire length of the facing strip progressively into facing engagement with portions of said metal strip as said portions advance to and through said second location along the track and means for rapidly cooling said faced strip at a subsequent location along the track.

9. Apparatus for producing decorative molding strips as defined in claim 8 wherein there is a transversely movable carriage at said second location along the said track, and said presser means is one of a plurality of generally similar presser means mounted on said carriage, and said facing strip holding means is one of a plurality of generally similar facing strip holding means mounted on said carriage, there being carriage shifting means for shifting said carriage intermittently thereby to bring one of said strip holding means and one of said presser means simultaneously into operative relationships to said track and then to bring another of said strip holding means and another of said presser means simultaneously into operative relationships to said track and control means responsive to each upward movement of a said presser means for operating said carriage-shifting means following each departure of a faced molding strip from said second location along the track.

10. Apparatus for producing decorative molding strips as defined in claim 8, wherein there is a surface roughing means for operating on the advancing metal strip before the strip reaches said second location along the track, thereby to roughen that surface of the metal strip which is to be covered by said flexible facing strip.

11. Apparatus for producing decorative molding strips as defined in claim 8 wherein there is means associated with said track beyond said second location and before said cooling means for applying relatively high bonding pressure to the faced molding strip advancing along the track from said second location.

12. Apparatus for producing decorative molding strips as defined in claim 8 wherein there is means beyond said second location along the track for elevating substantially the temperature of the faced molding strip advancing along said track from said second location, and pressure-applying means beyond said temperature elevating means for applying relatively high bonding pressure to the faced molding strip in its said elevated temperature condition.

13. Apparatus for producing decorative molding strips as defined in claim 8 wherein there is means associated with said track beyond said second location for applying relatively high bonding pressure to the faced molding strip advancing along the track from said second location, and a pair of relatively high speed rotary cutters mounted at opposite sides of said track beyond said bonding pressure applying means, said cutters being arranged and adapted to provide oppositely inclined surfaces at substantially spaced, opposite edge portions of the faced surface portion of said molding strip, the planes of the two said inclined surfaces intersecting each other at the faced side of said molding strip.

14. Apparatus for producing decorative molding strips as defined in claim 8 wherein there is a transversely movable carriage at said second location along the track and said pressing means and said strip holding means are mounted on said carriage, a second pressing means and a second strip holding means on said carriage in side by side relationships to the first mentioned pressing means and strip holding means respectively, actuating means for moving said carriage transversely of said track thereby to move the first mentioned pressing means and strip holding means out of operative relationships to said track and said second pressing means and strip holding means into operative relationships to said track, and means responsive to departure of said metal strip from said second location for effecting a carriage-moving operation of said actuating means.

15. The method of producing decorative molding strips as defined in claim 1 wherein the molding strip surface to be faced has a rounded lateral cross-section and wherein bonding pressure is applied to each longitudinal increment of said mutually advancing molding and facing strip successively over different portions of the lateral cross-section thereof.

References Cited by the Examiner
UNITED STATES PATENTS

| | | | |
|---|---|---|---|
| 203,896 | 5/78 | Dayton | 156—552 |
| 1,691,968 | 11/28 | Gingras | 156—267 |
| 1,787,404 | 12/30 | Taylor et al. | |
| 2,070,600 | 2/37 | Jenett | 156—311 X |
| 2,538,086 | 1/51 | Dennison | 100—167 |
| 2,628,177 | 2/53 | Boicey | 100—161 |
| 2,631,641 | 3/53 | Coffman | 156—552 |
| 2,728,703 | 12/55 | Kiernan | 156—321 |
| 2,732,880 | 1/56 | Hawk | 156—522 |
| 2,776,510 | 1/57 | Klopfenstein | 100—167 XR |
| 2,861,022 | 11/58 | Lundsager | 156—322 XR |
| 2,977,630 | 4/61 | Bazler | 156—267 XR |

EARL M. BERGERT, *Primary Examiner.*